Jan. 21, 1936.　　　　E. C. LOETSCHER　　　　2,028,616
APPARATUS FOR THE MANUFACTURE OF A COMPOSITE BUILDING MATERIAL
Filed Jan. 2, 1934　　　　4 Sheets-Sheet 1

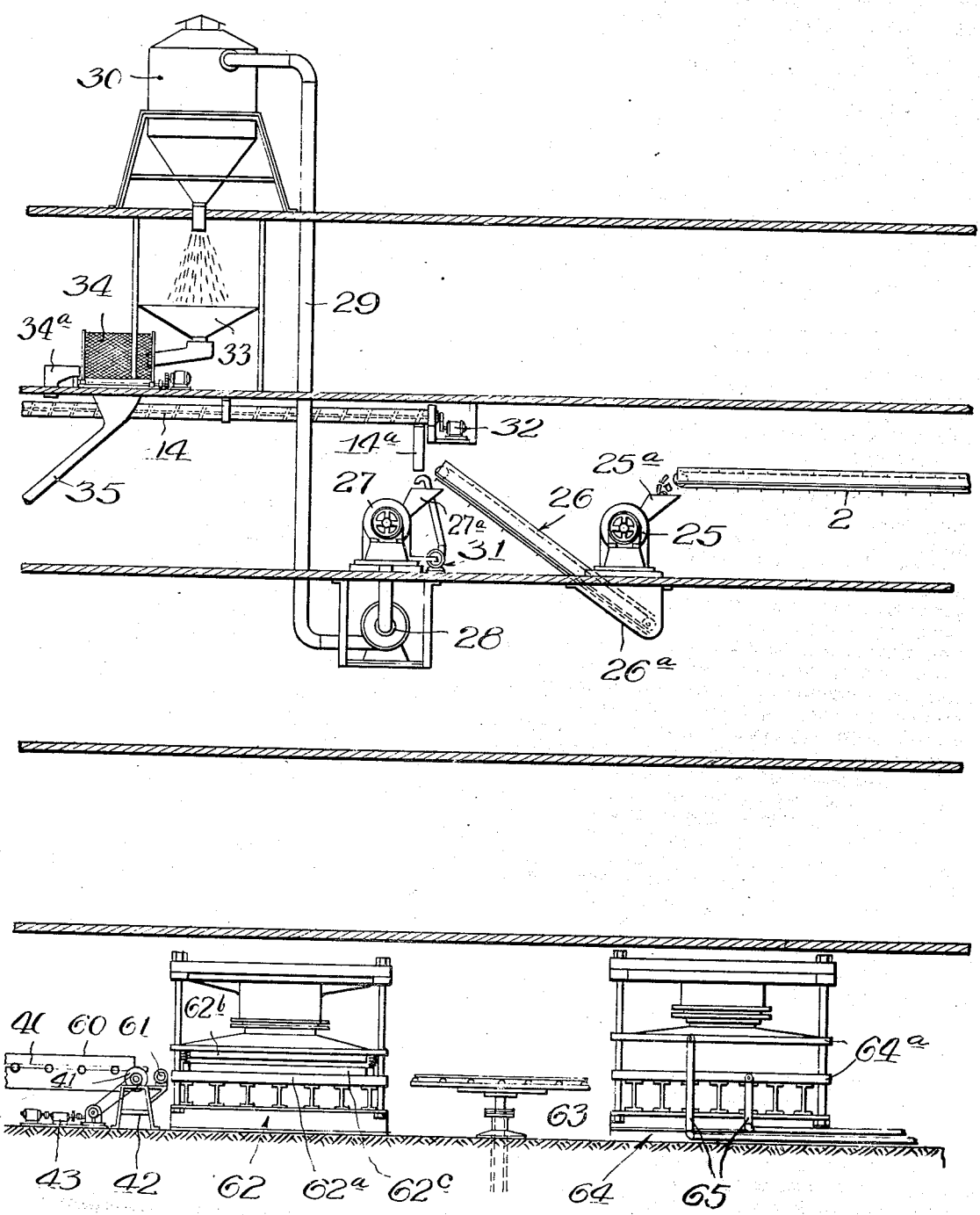

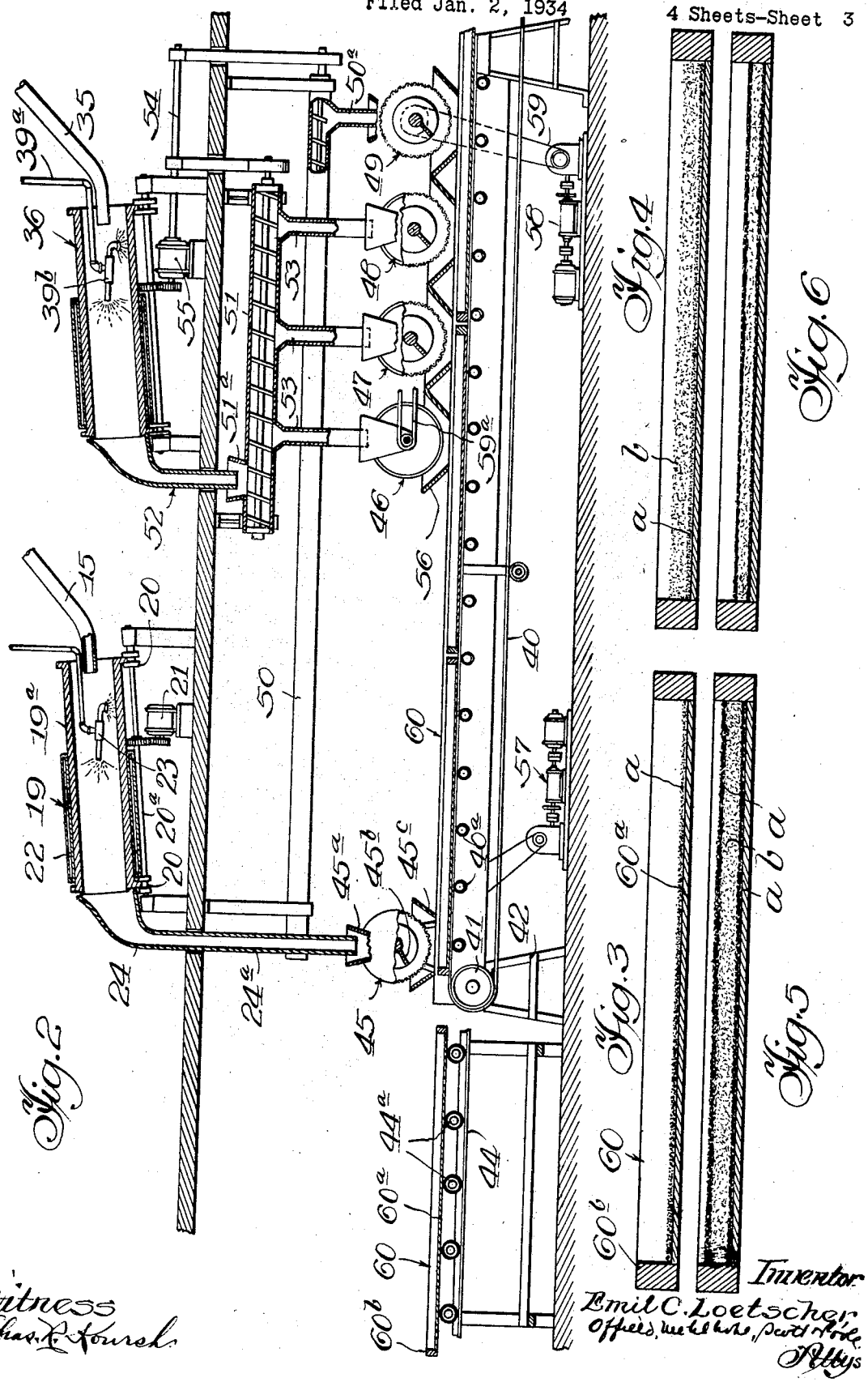

Jan. 21, 1936.  E. C. LOETSCHER  2,028,616
APPARATUS FOR THE MANUFACTURE OF A COMPOSITE BUILDING MATERIAL
Filed Jan. 2, 1934    4 Sheets-Sheet 4
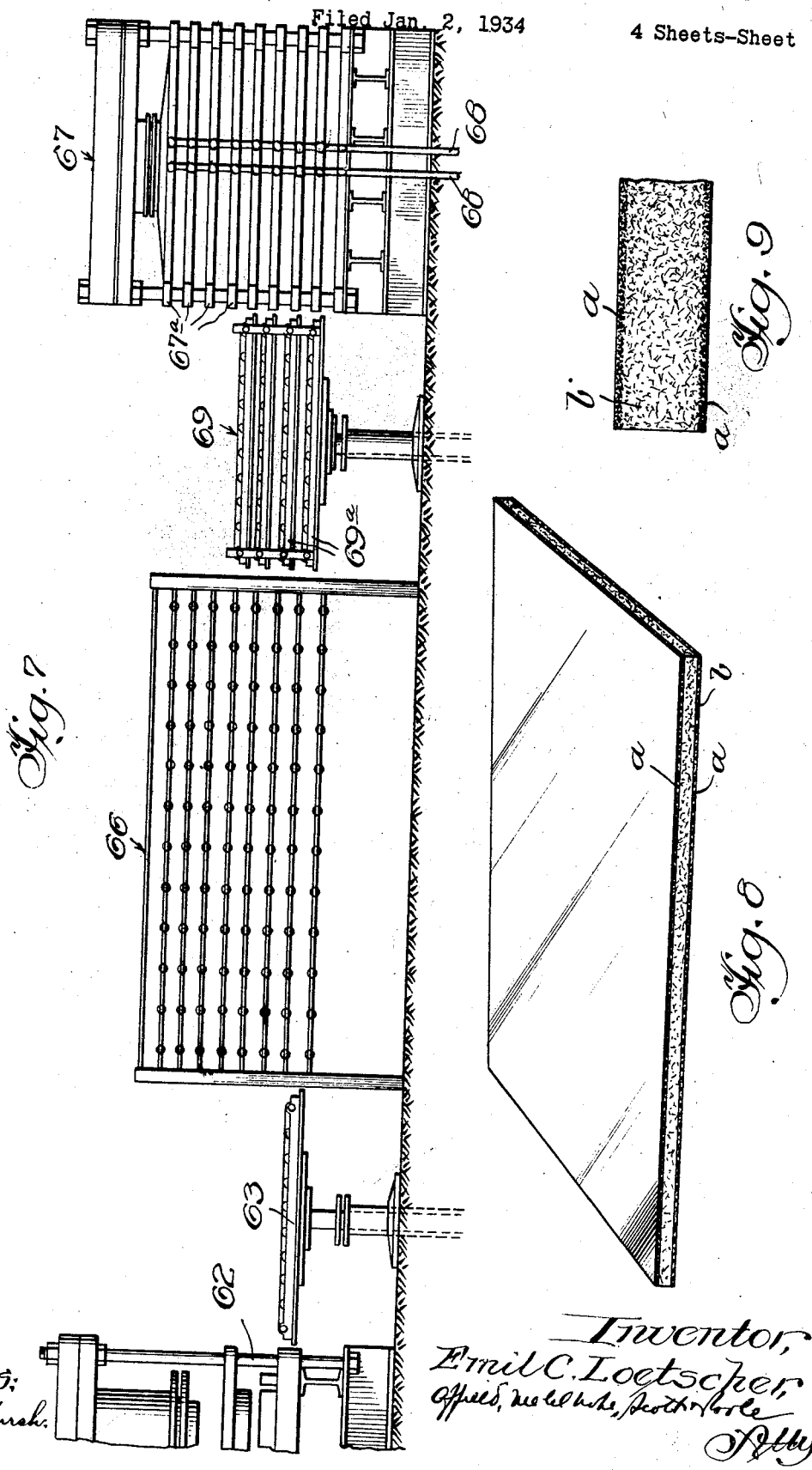

Patented Jan. 21, 1936

2,028,616

UNITED STATES PATENT OFFICE 2,028,616

APPARATUS FOR THE MANUFACTURE OF A COMPOSITE BUILDING MATERIAL

Emil C. Loetscher, Dubuque, Iowa

Application January 2, 1934, Serial No. 704,881

6 Claims. (Cl. 154—1)

This invention relates to improvements in apparatus for manufacturing a composite building material in the form of flat sheets or boards, and composed generally of finely divided wood particles having certain resins and other ingredients incorporated therewith to produce a hard waterproof material when compressed in the presence of heat.

The product to be made by the apparatus herein disclosed and the general process to be followed in its manufacture is the subject matter of an application filed by me on October 9, 1933, Serial No. 692,811.

The object of the present invention is to provide the necessary equipment, apparatus and devices for manufacturing the product commercially, and by a process that may be described as continuous, although some of the steps, as for instance the press operations, are of necessity intermittent in character. Hence one of the features of the invention is the correlation of the intermittent and continuous steps in such a manner as to make the production continuous in the sense that the term is generally applied to manufacturing operations.

The disclosure includes practically the entire equipment of a manufacturing plant or mill, from the handling of the raw materials to the completion of the finished product, and in this connection it may be observed that some of the apparatus used is standard equipment, particularly as pertaining to the reduction of the raw materials and their conveyance from one type of apparatus to another. However, those portions of the equipment which have to do with the assembly of the materials which make up the finished product and the manner in which they are handled in their progress through the assembly and pressing operations, are designed with a view to meeting the problems peculiar to the art and yet calculated to obtain and maintain an efficient standard of production.

Thus referring to the accompanying drawings,

Figures 1 and 1A are half sections of a single view in elevation of a complete mill for the manufacture of the product when placed edge to edge with Figure 1 on the left.

Figure 2 is an enlarged view in front elevation of the apparatus for treating and assembling the loose material preparatory to being compressed in board form.

Figures 3, 4, 5 and 6 are views in section through one of the forms, showing successive stages of the formation of the board prior to the final press operation.

Figure 7 is an enlarged detail view in elevation of the equipment for handling the material in forms for the multi-platen press operation.

Figure 8 is a perspective view of the finished board, and

Figure 9 is an enlarged sectional view of the finished board.

Figure 1:
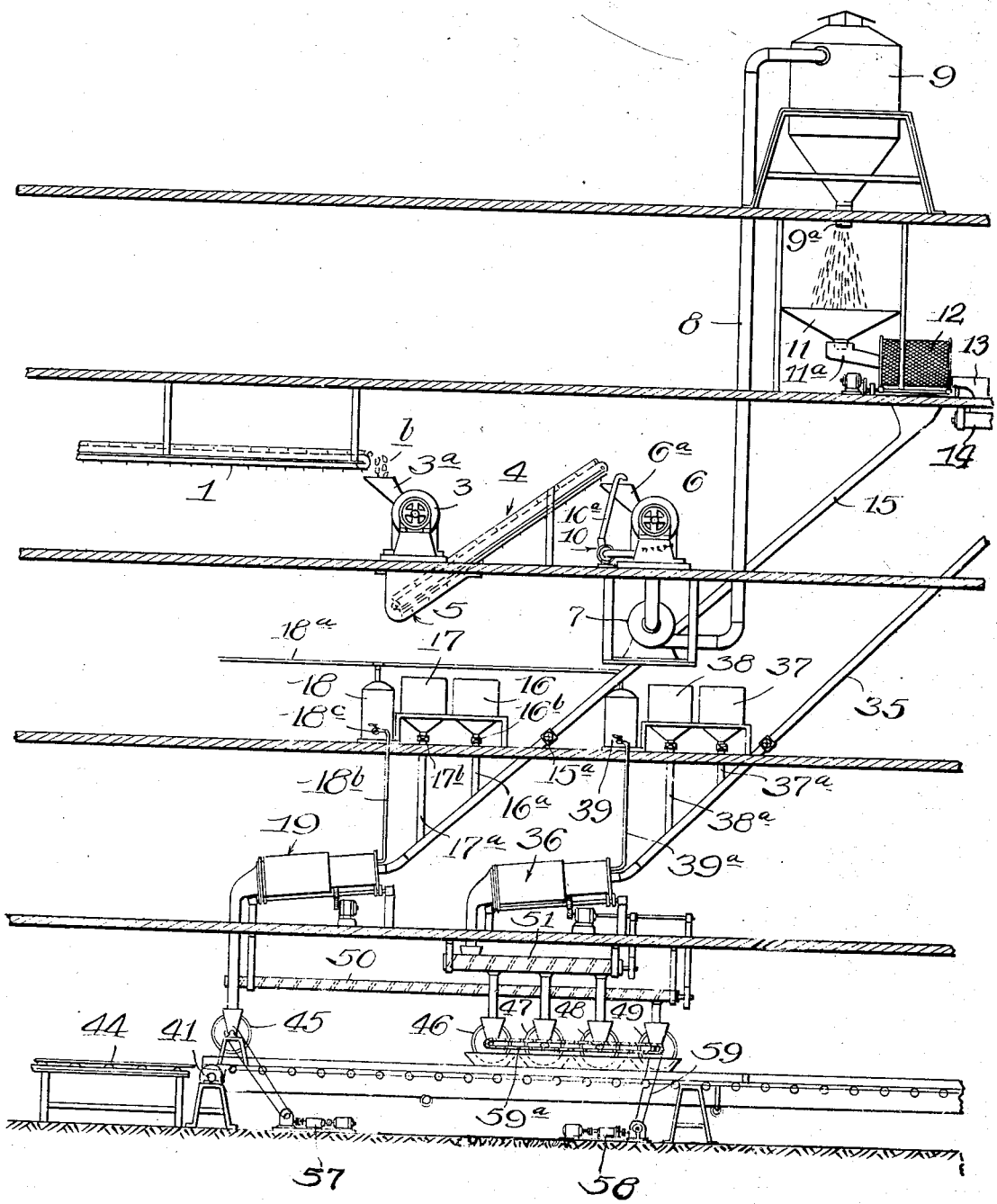

Referring to Figures 1 and 1A, it will be observed that the equipment for a plant is distributed throughout five (5) floors and the roof of a building which may be assumed to have been erected for the purpose, the general scheme being to receive the raw materials at the upper levels, and as they are treated or worked, to deliver them to the lower levels by gravity, their ultimate destination being the assembling and compressing units on the bottom or lower floor. However, it would be possible to arrange the plant within a one-story mill and on the same floor level by the use of suitable conveying equipment.

It may simplify the description by noting at the outset that two grades or kinds of wood fiber make up the product, and while they both go through the same course of reduction and treatment, they originate from different sources and hence are handled by groups of units which are practically duplicates of each other. Thus on Figure 1, there is an endless belt conveyor 1 on the fourth floor and to the left, which indicates the point where the raw material for the outer layers of the finished product first enter into the manufacturing process, whereas on Figure 1A in the same corresponding position on the right is a similar conveyor 2 from which the raw material for the center or core of the finished product commences its progress through several steps of reduction and paralleling those of the outer layer or finishing material. It may be explained at this point that the source of both raw materials is wood preferably in the form of small blocks, the chief difference being that the wood for the core material is of a highly resinous character, while that for the outer layers is so-called non-resinous wood, that is to say, wood of normal resin content.

Thus referring to Figure 1, the raw material in the form of small blocks $b$ of soft pine or other suitable wood of non-resinous character is delivered by the conveyor 1 to a motor driven hogging or hammer mill 3 entering through a hopper $3^a$. The blocks $b$ need not necessarily be of a uniform size, although preferably of a size which can be readily handled by the mill, the source of the material being chiefly the waste from wood working operations such as short ends of lumber. The mill 3 is of a standard type of equipment consisting of a cylindric housing in which are rotating knives or hammers which break up and reduce the blocks of wood into small chips or particles, say, 1½ inches long and ¼ to ½ inch in thickness. These chips drop from the mill onto an inclined conveyor 4 having its lower end enclosed within a housing or boot 5, and from thence are conveyed upwardly and discharged into a second mill 6 through a hopper 6ª, this latter mill being preferably of the hammer type whereby the chips are still further broken up and reduced to very small particles, say, ⅛ inch in length. The finely divided material is discharged from the mill 6 by gravity to be picked up by a blower 7 and conveyed upwardly through a pipe 8 into a so-called cyclone storage bin 9 conveniently located on the roof of the building. Before leaving the mill 6, however, the material passes through a screen of relatively fine mesh, whereby the coarser particles are screened out and returned to the mill for further reduction by means of an auxiliary blower 10 having a pipe 10ª leading to the hopper 6ª.

Now from the storage bin 9 the material is discharged by gravity through a gated outlet 9ª at its lower end into a hopper 11 on the floor below, and thence through a spout 11ª at the bottom of the hopper into a motor driven rotary screen 12, whereby the mass is thoroughly separated and the whole reduced to a uniformly fine texture, while the tailings, that is, the particles too large to pass the screen, are discharged through a chute 13 into a horizontal screw conveyor 14 to be disposed of as will hereinafter be described in connection with the companion core material reducing equipment.

The finely reduced material passing through the rotary screen 12 drops into a long vertically inclined chute 15 through which it is conveyed downwardly to the second floor traversing the two intermediate floors. Now, on the third floor (the second below the floor on which the screen 12 is located), is a battery of two bins 16 and 17 and a tank 18. The two bins 16 and 17 are provided with vertical pipes 16ª and 17ª leading from their bottoms directly downward into the material chute 15 and having regulating valves 16ᵇ and 17ᵇ therein. Likewise the chute 15 has a feed regulating valve or gate 15ª located just ahead of the point where the outlets from the tanks enter the chute. In these bins are maintained a supply of the chemical ingredients that are mixed with or added to the mass of wood particles, these being preferably a resin hardening agent, such as hydrated lime, and sulphur, in accordance with the process disclosed in said previous application.

It makes no particular difference which bin contains one or other of the added ingredients as both are added at substantially the same point, and further since the amounts discharged can be regulated by the valves.

The tank 18 contains a suitable synthetic resin, the preferred nature of which is also disclosed in said previous application, but for the purpose of the present disclosure may be considered as any suitable binder in liquid form having a resin base and diluted either with water or other dilutent to increase its spreading properties. The tank is supplied with resin through a pipe 18ª and is fed therefrom through a pipe 18ᵇ having a feed control valve 18ᶜ therein.

As clearly shown in Figure 2, the chute 15 discharges at its lower end into a rotary drier 19 consisting of a cylinder 19ª mounted on sets of rollers 20, 20 at a slight angle to the horizontal to roll about a fixed axis and driven by a motor 21 through suitable gearing to a shaft 20ª carrying the rollers 20. The inlet or elevated end of the cylinder is open and surrounding a portion of its length is a steam jacket 22 extending from the lower end to a point short of the open end. It is into the upper or unjacketed portion of the drier 19 that the material is introduced from the chute, it being noted that the discharge pipe 18ᵇ from the resin tank 18 also extends into the open end of the cylinder to a point beyond the end of the chute 15, and terminates in a transverse branch 23 having spray nozzles at each end, one directed radially and the other toward the lower end of the cylinder.

Closing the lower or discharge end of the drier cylinder 19ª is a hood-like receptacle 24 converging into a vertical chute 24ª leading downwardly to the head end of the material handling and produce assembling mechanism on the floor below.

But before proceeding with the discussion of the assembling and compressing apparatus, the other half of the material reducing mechanism for the core of the product will be identified and the course of the material traced therethrough, bearing in mind that this mechanism is for the most part a duplication of the reducing mechanism already described. Thus, starting with the conveyor 2 on Figure 1A, the raw material in the form of small blocks of highly resinous or pitchy wood, including knots and other refuse unsuitable for other purposes, is fed into a hammer mill 25 through its hopper 25ª, the partially reduced material being discharged by gravity into the boot 26ª enclosing the lower end of an upwardly inclined conveyor 26, whereby the material is emptied into a second hammer mill 27 on the same floor level, where it is screened and the sifted particles carried by a blower 28 through a chute 29 to another cyclone storage bin 30 on the roof above, while the tailings from the mill are returned for further reduction by means of an auxiliary blower conveyor 31 in the same manner as described in connection with the mill 6. However, there is an additional operation that takes place at the mill 27, namely, the transfer of the tailings from the rotary screen 12 (Figure 1) through the horizontal screw conveyor 14 to a point just above the hopper 27ª of the mill 27 where is located a discharge spout 14ª. A motor 32 for driving the conveyor 14 is supported from the ceiling just beyond the discharge end thereof.

Now, bearing in mind that the tailings thus transferred are composed of wood particles of a non-resinous character, it follows that the function of this screw conveyor 14 is to transfer a predetermined amount of the so-called non-resinous wood particles from its final reducing mill 12 to the corresponding mill 27 in the core material reducing line, the less resinous material thus added to and mixed with the pitchy wood particles reducing somewhat the resin content of the final core mix, as for instance in case the raw stock happens to be unusually high in natural resins. Manifestly the amount of non-resinous material added can be controlled as conditions require, or omitted entirely by diverting it to a storage bin for future use, if not needed at the time. But assuming that a certain amount of this material is required, it enters the mill 27 with the partially reduced wood particles from the mill 25, and the mixed particles further reduced before entering the storage bin 30.

From the storage bin 31 the required amount of the material is discharged into the hopper 33 below and thence into the rotary screen 34, the counterpart of screen 12, where it undergoes a further screening to remove any coarse particles that may be present, these coarse particles or tailings being also disposed of through a short discharge chute 34ᵃ into the screw conveyor 14 just below. And finally the bulk of the material properly screened is delivered by gravity from the screen 34 into a chute 35 paralleling the chute 15 through which it is discharged into another rotary drier 36 located on the same floor and adjacent the drier 19. The same arrangement of chemical storage bins 37 and 38 and a resin tank 39 is associated with the chute 35, but being duplicates of the previously described arrangement, need not be again discussed in detail. This is likewise true of the drier 36 which is the counterpart of drier 19 in every respect, except perhaps that it would be of greater size and capacity, inasmuch as the amount of material handled thereby is considerably greater.

Thus as before, the material enters the head or open end of drier 36 through chute 35, having previously had incorporated therewith the hardening agent and sulphur from the bins 37 and 38 through their respective discharge chutes 37ᵃ and 38ᵃ, whereas the resin from tank 39 is sprayed into the drier through its feed pipe 39ᵃ and spray head 39ᵇ.

From this point on the disclosure will be concerned with the mechanism for making the finished product from the material discharged from the driers 19 and 36, it being first noted that the material in both cases consists of dry finely divided wood particles having thoroughly mixed therewith the predetermined amounts of the pulverized hardening agent and sulphur, together with relatively small proportions of the synthetic resin present in the form of a thin coating adhering to the surface of the wood particles, as would naturally result from spraying a diluted solution of the resin into the revolving driers and subsequently heating the mass sufficiently to drive off the moisture. Moreover it will be recalled that the treated fibrous material discharged from the first drier 19 is preferably a light color due to its so-called non-resinous character, while that from the drier 36 is somewhat coarser in texture and much darker due to the high percentage of natural resins present, although the color of neither is materially affected by the addition of the synthetic resin which is preferably colorless or practically so.

Now on the floor immediately below the driers (Figures 1 and 2) is a long horizontal belt conveyor of standard design consisting of an endless belt 40 supported at its ends on pulleys 41, 41, which in turn are journalled on metal standards 42, 42 of table height. The upper lead of the belt is supported upon rollers 40ᵃ spaced apart at intervals and the belt driven through a variable speed motor unit 43 preferably driving the tail end pulley 41 (Figure 1A). The variable speed unit 43 is one of several similar devices used in driving various parts of the mechanism hereinafter to be described, and since they are devices commonly used for controlling the speed of any driven mechanism, they need not be described, except to point out that they permit the driving speed to be regulated within a considerable range.

Immediately in front of the head pulley 41 of the belt conveyor is a feed table 44 having a top surface made up of spaced rollers 44ᵃ and in alignment with the upper lead of the belt. Erected immediately above the head end of the conveyor and directly beneath the discharge chute 24 from the surface material drier 12 is a rotary screening drum 45 not unlike those used in the preliminary stages of preparing the material for the manufacturing operation. Described briefly, the screening drum consists of a rotating cylinder of fine wire mesh with closed ends, and having a hopper-like intake member 45ᵃ through one end, and if necessary a stationary conveyor 45ᵇ extending axially of the drum to distribute the material lengthwise thereof as it enters from one end. A hopper 45ᶜ encloses the lower section of the drum with its walls converging to an opening extending the width of the belt 40 and spaced a matter of several inches above its surface. Thus the material from the drier 19 above is discharged through the chute 24ᵃ into the hopper 45ᵃ and thence into the rotating drum, and finally sifted through into forms advancing on the conveyor belt as will presently be described. In connection with this screening drum, it may be noted that it is one of several similar units employed, so that it may be assumed that they are driven and function in the same way, all of which will be presently disclosed.

Thus, some distance beyond the first screening drum 45 is a battery of four similar screening drums, the first three (from left to right, Figure 2) 46, 47 and 48 being grouped together as performing successive steps in the same screening operation, while the last or fourth drum 49 is coupled with the drum 45 at the head end of the belt to form a complementary pair. It will be manifest that this grouping is in accordance with the sources from which they receive the material handled thereby. Thus the pair consisting of the first and last drums 45 and 49 are fed from the drier 19 on the left, and the intermediate three drums 46, 47 and 48 are supplied from the second or right-hand drier 36 immediately above, and through the medium of two horizontal overhead screw conveyors 50 and 51, respectively.

The first of these conveyors 50 extends from the down chute 24ᵃ from the drier 19 to the far or last drum 49, its function being to intercept substantially one-half of the material discharged from the drier 19 and carry it over to the last drum 49 by a discharge chute 50ᵃ so that substantially equal parts are delivered to each of the first and last drums in the series.

The other or second screw conveyor 51 is comparatively short and of somewhat greater capacity, taking in the group of three intermediate drums 46, 47 and 48. An entrance 51ᵃ at the head end of this conveyor communicates with a discharge chute 52 leading from the drier 36 immediately above, and just beyond the intake are three depending spouts 53 opening into the hopper-like intakes to the drums below. There is nothing particularly novel about these conveyors, being of the usual screw type supported from the ceiling above, the screw element of each being preferably belt-driven from a shaft extension 54 of the driving motor 55 for the drier 36, as clearly shown in Figure 2.

And finally, these screening drums are driven by two motors equipped with variable speed units 57 and 58, one located near the forward end of the conveyor and driving the first drum 46, while the second is located beneath the four drums beyond and drives them all through a belt or chain 58 to the last drum 49, and thence by cross sprocket chain 59ᵃ to the other drums, it being manifest that the usual arrangement of sprockets transmitting the power from the variable speed units to the drums and from drum to drum is employed.

Referring now to the operation of the mechanism from the point of discharging the material from the driers 19 and 36 through the initial formation of the ultimate product, the process starts at the table 44 at the head end of the conveyor belt. On this table is assembled the forms 60 in which the material is assembled, each form consisting of a flat metal plate 60ᵃ having a smooth polished surface on at least one side and of the size of the finished product, say, twelve (12) feet in length and four (4) feet in width, and of sufficient thickness to retain its rigidity. This plate 60ᵃ is laid on the table lengthwise, that is, endwise toward the conveyor belt, with its polished side up (as shown in Figure 1), and clamped around the edge of this plate is a removable frame 60ᵇ made up of wood rails set on edge and projecting above the plate, say, 2½ inches, thus forming a shallow mold. This form when set up (as shown in Figure 2) is then shifted endwise onto the belt where it is picked up and carried forwardly beneath the screening drum 45, it being assumed, of course, that the plant is in continuous operation and that as one form is assembled on the table 44 and advanced, another follows it in close order. Thus as each form passes beneath the first drum 45, a layer a of the outer coating material is sifted onto the plate to a uniform thickness of, say, ½ an inch as shown in Figure 3. Having passed the first drum, the form is advanced beneath the battery of drums 46, 47, 48 and 49 beyond, the first three drums successively sifting or depositing superimposed layers of the core material until the complete layer b of the desired thickness of, say, 1½ or 2 inches has been built up on the previously deposited bottom layer a as shown in Figure 4. And finally, as the form passes beneath the last drum 49, the upper or other outer finishing layer a is deposited upon the core material, thus duplicating the first or bottom layer a, to the end that having traversed the screening drums, the material in the form assumes the stratified appearance shown in Figure 5, that is, a thick central core b and relatively thin top and bottom layers a, a filling the form practically to the top edges of the rails.

The material, however, is comparatively loose and unstable as it is initially deposited in the form, and as a consequence is next subjected to a partial compression. Thus referring to Figure 1A, the forms, of which there are a number constantly being assembled and shifted onto the conveyor, finally reach the tail end of the conveyor, having traveled at a predetermined speed determined by the setting of the variable speed mechanism 43, it being noted that the thickness of the layers of material deposited in the forms is directly proportional to the speed of the conveyor belt. Immediately beyond the end of the conveyor and with only a guide roller 61 between is a hydraulic press 62 of any standard design, comprising generally a fixed bed 62ᵃ elevated at the same height as the conveyor belt 40 and guide roller 61, and a depressible platen 62ᵇ above the bed. The platen has the form of a thick plate projecting from the under side of the platen frame and having the same dimensions as the internal dimensions of the forms 60, so that when the latter are centered beneath the platen and the pressure applied, the side rails of the forms embrace the platen. Suitable means are provided for properly centering the forms in the press and confining the side rails against lateral distortion during the press operations, as for instance a frame made up of rails 62ᶜ secured to the bed of the press and adapted to surround each form. For the preliminary pressing operation, the platen need not be heated and a moderate pressure of, say, 500 pounds per square inch is ample, inasmuch as the purpose is merely to compact the material into the form of a mat of sufficient density to maintain its shape after the side rails of the form are removed. Thus assuming the thickness of the material is 2½ inches before the initial pressing operation, it is reduced to a mat of, say, ½ inch in thickness as shown in Figure 6. The pressing operation takes but a few seconds, and hence each cycle consists of transferring a form from the conveyor belt into the press, with the upstroke of the platen and the shifting of the preceding form endwise from the forward end of the press.

For handling the forms 60 as they come from the press 62, a hydraulic lift 63 is preferably used. This lift located immediately beyond the press, consists of a plunger 63ᵃ sunk below the floor and supporting a roller top platform 63ᵇ of approximately the dimensions and area of the forms. The lift is provided with the usual operating devices for elevating and depressing the platform to the desired level, but for the present it may be considered merely as a table having its top surface at the same level as the bed of the press 62. Thus as the forms carrying the partially compressed mats are shifted from the press, they are momentarily supported upon the lift, during which time the side rails 60ᵇ of the form are now removed, leaving the mat supported upon the bottom plate 60ᵃ, said rails being returned to the table 44 at the head of the conveyor for assembling another form.

It will be observed that the press operation is intermittent, whereas the forms are advanced by the conveyor toward the press at a constant speed, and hence it is necessary to time the travel of the conveyor and the press cycles, so that there will be no interruption in the continuous operation of the process. Similarly, having transferred a form from the press onto the lift 63, the side rails must be removed and the mat with its supporting plate 60ᵃ disposed of before the next form is delivered from the press.

Now at this point in the manufacturing process, two methods may be followed in carrying out the final press operation whereby the mats are reduced to their final thickness and density. The simplest method is that of pressing one or perhaps two mats in the same press operation, using a single platen press 64 as shown in Figure 1A. This press is similar in most respects to the first press 62, except that it is capable of exerting greater pressure, say, from 1200 to 1500 pounds per square inch, and is equipped with hollow top and bottom platens 64ᵃ both being capable of being heated by circulating steam through them, and likewise of being artificially cooled by shutting off the steam and circulating water through them. To this end the steam at a pressure of, say, 80 pounds per square inch is supplied to the platens through pipe and flexible hose connections 65, 65, the same piping being used for the cooling water, if necessary.

Thus following through the single platen press operation, the forms 60 as they are shifted from the first press 62 onto the lift 63 are first disassembled by removing the side rails as already described, and then another plate similar to the bottom plate 60ª of the form is placed on top of the mat with its polished surface down. The complete assembly is then shifted endwise into the press 64 for the final pressing operation. Another procedure is to assemble two mats, one upon the other on the lift, placing a plate upon the uppermost mat as before, and then sliding the complete assembly of plates and mats into the press, thus compressing two mats in the same operation. This latter method is perhaps preferable, inasmuch as the final press cycle requires a greater length of time than the preliminary press operation, and hence by pressing the mats two at a time, it makes it possible to synchronize the two press operations with the intermediate step of disassembling the forms and applying the top plate. So, too, the lift 63 is advantageous in the two mat assembly method as it can be depressed slightly after the first mat is prepared, so that the second can be placed on top of it without unnecessary lifting.

Now, the other method and the one that would be used where large scale production is to be maintained, is to use a multi-platen press instead of a single platen press, that is, a press having a plurality of platens, say, 12 or more, and capable of pressing the same number or even double the number of mats in a single press cycle. Such a press would be considerably larger than a single platen press, to the extent of multiplying the number of platens which would all be of the hollow heated type.

Manifestly such a press would be filled or loaded to capacity of each press cycle, and while the duration of each cycle may be slightly longer than required for the single platen press operation, it is obvious that the output is many times greater. This, of course, means that the preceding steps of the process would be considerably accelerated and, therefore, necessitate some means of storing the pressed mats as they come from the first press and preparatory to loading the second and final press.

Thus referring to Figure 7, a practical arrangement for handling the forms and loading the multi-platen press is as follows: Immediately beyond the preforming press 62 is the lift 63 as before, but instead of the mats being loaded directly into the final or finishing press, they are loaded into a storage rack 66, consisting of stationary framework made up of a plurality of horizontal shelves or tiers of roller surfaces. The length of the rack is twice or three times the length of the boards, so that two or three plate-supported mats can be stored end to end on one tier. Thus the capacity of the rack may be greater than that of the multi-platen press, so there is always ample room to take the output from the preforming press at the receiving end by shifting the mats forwardly toward the discharge end from which the multi-platen press is loaded. Now, beyond the rack 66 is the multi-platen press 67 having the series of vertically disposed platens 67ª heretofore mentioned and which are hollow and steam-heated through pipe and hose connections 68 in the same manner as the single platen press.

Thus assuming that the tiers of the storage rack were the same in number as the platens of the press and in alignment therewith, it would be then practical to load directly from one to the other without an intermediate handling by placing the press in close proximity to the rack. But this may not be practical in all instances, and hence the preferred arrangement is to have a less number of tiers in the storage rack and to introduce an intermediate hydraulic lift 69 similar to the lift 63, except that it has a plurality of tiers 69ª with roller surfaces, the number being preferably a multiple of the number of platens in the press, so that the latter can be fully loaded with two or more loads from the lift. To expedite the loading of the press, suitable means may be incorporated in the lift 69 for sliding all of the mats simultaneously into the press.

It is also possible to compress two or even more mats between the same pair of platens in the multi-platen press operation, particularly where the final product is relatively thin. In this case the mats are assembled before they reach the storage rack by the general method already outlined, namely, by placing one mat upon another either with a top and bottom plate back to back between them or a single plate having both surfaces polished, substituted therefor. When the press is loaded, the pressure is applied for a period of from 3 to 5 minutes at, say, 1200 pounds pressure, it being noted that the time of the press cycle and the pressure applied may vary somewhat with the number and thickness of the boards being produced, the temperature of the steam and other conditions that may enter into a given manufacturing operation.

Upon the completion of the final press operation the board-like product together with its surface plates are removed from the press, it being ordinarily unnecessary to cool the platens before introducing the next load of mats into the press. In the case of exceptionally thick boards it may be desirable to cool the platens down somewhat, say to 180° F. by shutting off the steam and passing cooling water through them for a short period. This, however, is not ordinarily required, as there is insufficient moisture in the material to make it necessary to bring the temperature down in order to avoid the possible rupturing of the product by the steam that might otherwise be generated. In short, the product is for all practical purposes dry when it enters the press.

The finished product as it comes from the press is a hard dense board of high moisture and fire-resisting properties. Its surface is perfectly smooth with a finish resembling that of a rubbed down varnished surface. As to its composition and the reactions which take place to bring about these desirable physical properties, they are fully disclosed in said previous application, and hence need not be elaborated upon here.

However, there are certain novel features in the manufacture of the product commercially which merit consideration. In the first place, the design and arrangement of mechanism which permits of its manufacture by a continuous process is of the utmost importance from a production standpoint, as it makes possible the manufacture in large quantities and at a low cost. Secondly, the problem of obtaining uniformity and perfection of the product has been solved by utilizing the rotary screen sifting method of building up the initial mat, thereby insuring both a uniformity of thickness and surface finish not obtainable in any other way.

And finally, the entire manufacturing process has been reduced to a sequence of properly coordinated steps by the novel combination and arrangement of both old and new mechanism and devices in which flexibility and accurate control of the quality of the product is attained.

Having set forth a preferred embodiment of the apparatus for producing an equally new and useful product,

I claim as my invention:

1. In an apparatus of the character described, the combination of a horizontal conveyor adapted to advance shallow open forms of board dimensions at a predetermined constant speed, a sifting device above said conveyor, means for feeding a loose material to said sifting device, and means for operating said sifting device whereby layers of predetermined uniform thickness and density are deposited in said forms.

2. In an apparatus for the purpose described, comprising a horizontal traveling conveyor adapted to advance forms of board dimensions at a constant speed from one end to the other thereof, a sifting device mounted above said conveyor and including a rotary screen extending transversely of the path of said forms, means for feeding a finely divided material to said sifting device, and means for operating said sifting device whereby the material is discharged therefrom and deposited in layers of uniform thickness and density in said forms.

3. In an apparatus for the purpose described, the combination of a horizontal conveyor adapted to advance forms of board dimensions in close order from one end to the other thereof, a plurality of rotary sifting devices located above and spaced apart at intervals along said conveyor, means for feeding a loose material to said sifting devices, and independent operating means for said sifting devices whereby superimposed layers of predetermined uniform thickness and density are deposited in said forms.

4. In an apparatus for the purpose described, the combination of a horizontal traveling conveyor for advancing in close order a series of open forms of board dimension at a predetermined speed and in a horizontal path, a series of sifting devices positioned above and at intervals along said conveyor, each including a rotary screen extending transversely of the path of said forms, means for feeding loose materials to said sifting devices, and variable speed driving mechanisms for said sifting devices whereby superimposed layers of the loose material are deposited in superimposed layers of uniform thickness and density into the advancing forms.

5. In an apparatus of the character described, the combination of a horizontal traveling conveyor adapted to advance forms of board dimensions from one end to the other thereof, a series of sifting devices mounted above and at spaced intervals along said conveyor, means for feeding loose materials of different compositions to predetermined sifting devices, and independent variable operating means for said sifting devices whereby the materials are deposited into said advancing forms in superimposed layers of predetermined uniform density and thickness.

6. In an apparatus of the character described, the combination of a horizontal traveling conveyor adapted to advance forms of board dimensions from end to end thereof, means for driving said conveyor at predetermined constant speeds, a plurality of material sifting devices mounted above and at spaced intervals along said conveyor, means for feeding a loose material of one composition to the first and last sifting devices and for feeding a loose material of the other composition to the intermediate sifting device, and independent variable operating mechanisms for said first, last and intermediate sifting units whereby the materials are successively deposited into the advancing forms in superimposed layers of uniform thickness and density, but capable of variation in actual thickness by the relative speeds of the conveyor and the operating mechanisms of said sifting devices.

EMIL C. LOETSCHER.